(12) United States Patent
Imai et al.

(10) Patent No.: US 11,931,843 B2
(45) Date of Patent: Mar. 19, 2024

(54) TURNING TOOL AND TURNING METHOD (71) Applicant: MITSUBISHI MATERIALS CORPORATION, Tokyo (JP)

(72) Inventors: Yasuharu Imai, Tokyo (JP); Yosuke Sato, Tokyo (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 905 days.

(21) Appl. No.: 16/965,140

(22) PCT Filed: Jan. 30, 2019

(86) PCT No.: PCT/JP2019/003125
§ 371 (c)(1),
(2) Date: Jul. 27, 2020

(87) PCT Pub. No.: WO2019/151309
PCT Pub. Date: Aug. 8, 2019

(65) Prior Publication Data
US 2021/0039219 A1 Feb. 11, 2021

(30) Foreign Application Priority Data
Feb. 1, 2018 (JP) .................. 2018-016279

(51) Int. Cl.
*B23Q 17/22* (2006.01)
*B23B 1/00* (2006.01)
(Continued)

(52) U.S. Cl.
CPC ............ *B23Q 17/2233* (2013.01); *B23B 1/00* (2013.01); *B23B 25/06* (2013.01); *B23B 27/08* (2013.01)

(58) Field of Classification Search
CPC .. B23Q 17/22; B23Q 17/225; B23Q 17/2258; B23Q 17/2233; B23Q 17/2266;
(Continued)

(56) References Cited

U.S. PATENT DOCUMENTS 4,620,281 A * 10/1986 Thompson ......... G05B 19/4065
73/104
5,573,335 A 11/1996 Schinazi
(Continued)

FOREIGN PATENT DOCUMENTS

CN 1705860 A 12/2005
CN 102059362 A 5/2011
(Continued)

OTHER PUBLICATIONS

Office Action dated Jun. 3, 2021, issued for Chinese Patent Application No. 201980008944.4 and English translation of the Search Report.
(Continued)

*Primary Examiner* — Herbert K Roberts
(74) *Attorney, Agent, or Firm* — Locke Lord LLP (57) ABSTRACT

A turning tool includes a tool body extending along a tool axis and having a base on a tip of the tool body, a cutting insert detachably attached to the base, and a measurement device attached to the tool body. The measurement device has a first distance sensor which measures a distance to an object located radially outward of the tool axis.

16 Claims, 8 Drawing Sheets

(51) Int. Cl.
  *B23B 25/06* (2006.01)
  *B23B 27/08* (2006.01)
(58) Field of Classification Search
  CPC ............... B23Q 17/2275; B23B 25/06; B23B 2260/128; B23B 2270/48; G05B 2219/37423; G05B 2219/37425
  See application file for complete search history.

(56) References Cited

U.S. PATENT DOCUMENTS

| | | | |
|---|---|---|---|
| 5,857,812 | A | 1/1999 | Stahl |
| 2005/0245178 | A1 | 11/2005 | Takashima et al. |
| 2006/0048402 | A1 | 3/2006 | Haimer |
| 2015/0314411 | A1 | 11/2015 | Samukawa et al. |
| 2016/0170404 | A1* | 6/2016 | Asada ............... G05B 19/4065 700/175 |
| 2017/0357243 | A1 | 12/2017 | Takayama et al. |

FOREIGN PATENT DOCUMENTS

| | | | |
|---|---|---|---|
| CN | 106363461 A | | 2/2017 |
| CN | 106735484 A | | 5/2017 |
| EP | 2377645 A1 | | 10/2011 |
| JP | S58-010163 B2 | | 2/1983 |
| JP | S59-028442 U | | 2/1984 |
| JP | H01-138504 U | | 9/1989 |
| JP | 05-023952 A | | 2/1993 |
| JP | H05-023952 A | | 2/1993 |
| JP | H07-015201 U | | 3/1995 |
| JP | 08-132304 A | | 5/1996 |
| JP | H08-132304 A | | 5/1996 |
| JP | H10-505009 A | | 5/1998 |
| JP | 2003-032764 A | | 1/2003 |
| JP | 2005-335055 A | | 12/2005 |
| JP | 2006-510021 A | | 3/2006 |
| JP | 2014-008588 A | | 1/2014 |
| JP | 2015223684 A | * | 12/2015 |
| JP | 2017-220111 A | | 12/2017 |
| WO | 2014/091884 A1 | | 6/2014 |

OTHER PUBLICATIONS

Notice of Allowane dated Jan. 18, 2022, issued for Chinese Patent Application No. 201980008944.4 and English translation thereof.
International Search Report dated Apr. 23, 2019, issued for PCT/JP2019/003125 and English translation thereof.
Office Action dated Sep. 28, 2021, issued for Japanese Patent Application No. 2018-016279 and English translation thereof.
Supplementary European Search Report dated Oct. 29, 2021, issued for European Patent Application No. 19747593.2 and English translation thereof.

* cited by examiner

TURNING TOOL AND TURNING METHOD

TECHNICAL FIELD

The present invention relates to a turning tool and a turning method.

Priority is claimed on Japanese Patent Application No. 2018-016279, filed Feb. 1, 2018, the content of which is incorporated herein by reference.

BACKGROUND ART

Patent Literature 1 discloses a multi-spindle automatic lathe which can measure dimensions of a workpiece during a machining process.

CITATION LIST

Patent Literature

[Patent Literature 1] Japanese Unexamined Utility Model Application, First Publication No. H7-15201 (A)

SUMMARY OF INVENTION

Technical Problem

Generally, in machining using an automatic lathe, dimensions of a workpiece are not measured during a machining process. Therefore, with regard to a portion that does not appear in dimensions for final finishing such as rough machining, it is difficult to adjust the dimensions changed due to abrasion of a cutting edge. In addition, in a case where a machined surface is measured during the machining process, a tool needs to be sufficiently drawing apart from the workpiece to measure the machined surface. Furthermore, the tool needs to be moved close to the workpiece again to carry out additional machining Therefore, a machining time required for turning machining is lengthened, thereby causing a problem in that machining cost increases.

The present invention is made in view of the above-described circumstances, and an object thereof is to provide a turning tool which can reduce the machining cost by shortening the time required for measurement.

Solution to Problem

According to an aspect of the present invention, a turning tool is provided, including a tool body extending along a tool axis and having a base on a tip of the tool body, a cutting insert detachably attached to the base, and a measurement device attached to the tool body. The measurement device measures a distance from the tool body to an object.

According to the above-described configuration, a machined surface machined using the cutting insert can be measured by the measurement device. Therefore, after the turning tool forms the machined surface, when the machined surface is measured, it is not necessary to perform a step of temporarily drawing apart the turning tool from a workpiece. As a result, it is possible to shorten the time required for a measurement step during turning machining.

In the above-described turning tool, the measurement device may have a first distance sensor which measures a distance to an object located radially outward of the tool axis.

According to the above-described configuration, the turning tool has the first distance sensor which measures the distance to the object located radially outward of the tool axis. That is, the turning tool can measure the distance to the radially facing machined surface machined by the cutting insert. After the turning tool forms the radially facing machined surface, when the machined surface is measured, it is not necessary to perform the step of temporarily drawing apart the turning tool from the workpiece. As a result, it is possible to shorten the time required for a measurement step during turning machining.

The first distance sensor can measure an outer diameter, an inner diameter, roundness, and surface roughness of the radially facing surface, which are machined by the cutting insert.

In the above-described turning tool, an axial position of the tool axis of a measurement point measured by the first distance sensor may overlap an axial position of the cutting insert.

According to the above-described configuration, the first distance sensor can measure a periphery of a cutting position of the cutting insert. Therefore, in the measurement step performed by the first distance sensor, it is possible to reduce a movement distance for moving the turning tool in an axial direction of the tool axis. As a result, it is possible to shorten the time required for a measurement step during turning machining.

In the above-described turning tool, the tool body may have a first accommodation hole extending along an axial direction of the tool axis, and an opening hole extending radially outward of the tool axis from the first accommodation hole and opening on an outer peripheral surface of the tool body. The first distance sensor may be accommodated in the first accommodation hole. A detector of the first distance sensor may be exposed radially outward from the opening hole.

According to the above-described configuration, the first distance sensor is incorporated into the tool body. Therefore, the first distance sensor can be protected.

In the above-described turning tool, the measurement device may have a second distance sensor which measures a distance to an object located on an axial tip side of the tool axis.

According to the above-described configuration, the turning tool has the second distance sensor which measures the distance to the object located on the axial tip side of the tool axis. That is, the turning tool can measure the distance to the axially facing machined surface machined by the cutting insert. After the turning tool forms the axially facing machined surface, when the machined surface is measured, it is not necessary to perform the step of temporarily drawing apart the turning tool from the workpiece. As a result, it is possible to shorten the time required for a measurement step during turning machining.

The second distance sensor can measure an axial position of a stepped portion and a hole bottom portion, and surface roughness of the axially facing machined surface, which are machined by the cutting insert.

In the turning tool described above, the tool body may have a second accommodation hole extending along the axial direction of the tool axis and opening on the tip of the tool body. The second distance sensor may be accommodated in the second accommodation hole. A detector of the second distance sensor may be exposed to the axial tip side from an opening of the second accommodation hole.

According to the above-described configuration, the second distance sensor is incorporated in the tool body. Therefore, the second distance sensor can be protected.

A turning method according to the aspect of the present invention is a turning method using the above-described turning tool, the turning method includes a turning step of forming a machined surface by bringing the cutting insert into contact with the workpiece while rotating the workpiece around a spindle so that the workpiece is machined to a target position, and a measurement step of causing the measurement device to measure a position of the machined surface by locating the machined surface inside a detection range of the measurement device.

According to the above-described configuration, after the turning step, the measurement step can be performed without temporarily drawing apart the turning tool from the workpiece. As a result, it is possible to shorten the time required for a measurement step during turning machining.

The turning method according to the aspect of the present invention has a comparison step of comparing the target position of the machined surface in the turning step with a measurement position of the machined surface measured in the measurement step.

According to the above-described configuration, dimensional accuracy of the turning machining using the turning tool can be confirmed by comparing the target position of the machined surface in the turning step with the measurement position of the machined surface in the measurement step.

The above-described turning method may include an additional machining step of additionally machining the workpiece by using the turning tool in accordance with a difference between the target position and the measurement position in the comparison step.

According to the above-described configuration, dimensional accuracy of the machined surface can be improved by performing the turning step by bringing the turning tool closer to the workpiece side from the target position, based on the difference in the comparison step.

In the above-described turning method, the comparison step may include a cutting insert replacement step of replacing the cutting insert, in a case where the difference between the target position and the measurement position exceeds a threshold.

According to the above-described configuration, in a case where the difference in the comparison step exceeds the threshold, it can be determined that abrasion of the cutting insert is remarkable. In this manner, it is possible to easily determine the timing for replacing the cutting insert.

In the above-described turning method, the target position of the machined surface in the turning step, the measurement position of the machined surface measured in the measurement step, and a cumulative machining amount of the workpiece machined using the cutting insert may be stored in an external server via a network.

According to the above-described configuration, the external server stores the target position, the measurement position, and the cumulative machining amount. In this manner, the data can be utilized for more preferable machining conditions and life setting of the cutting insert.

In the above-described turning method, the external server may pre-store threshold data of an abrasion loss of the cutting insert which needs to be replaced. The external server may transmit the threshold data via a network to the turning tool or a machine tool to which the turning tool is attached.

According to the above-described configuration, the external server stores the threshold data. Therefore, the cutting insert can be replaced, based on the threshold data obtained from the external server.

In the above-described turning method, the external server may store the cumulative machining amount in a case where the difference between the target position and the measurement position exceeds the threshold data, as a critical cumulative machining amount.

According to the above-described configuration, the external server can store the critical cumulative machining amount from which it is expected that the cutting insert needs to be replaced.

In the above-described turning method, when the cumulative machining amount approaches the critical cumulative machining amount, the external server may transmit a notification signal via a network to the turning tool or the machine tool to notify that the cutting insert shortly needs replacing.

According to the above-described configuration, the external server can notify the turning tool or the machine tool of a replacement time for the cutting insert via the network. An operator can prepare for replacing of the cutting insert, based on the notification.

In the above-described turning method, when the notification signal is received, the comparison step may be performed, and in a case where the difference between the target position and the measurement position is greater than the threshold data, the cutting insert may be replaced.

According to the above-described configuration, the turning tool or the machine tool can display a warning prompting the operator to replace the cutting insert by comparing the threshold data with the difference when the notification signal is received. In addition, the operator confirms the warning display, and replaces the cutting insert. In this manner, it is possible to improve reliability of the turning step.

In the above-described turning method, a machining condition in the turning step may be stored in the external server via a network.

According to the above-described configuration, the external server stores the data of the machining conditions. In this manner, the data can be utilized for more preferable machining conditions and life setting of the cutting insert.

In the above-described turning method, the machining condition may include at least one of the type of cutting insert, the type of workpiece, the diameter of the workpiece, the rotation speed of the spindle, the cutting depth of the turning tool, and the feed-speed of the turning tool.

According to the above-described configuration, parameters described above are included as the machining conditions. Therefore, the parameters can be utilized for more preferable machining conditions and life setting of the cutting insert.

In the above-described turning method, the external server may pre-store threshold data of an abrasion loss of the cutting insert which needs to be replaced. The external server may determine that the cutting insert is replaced in a case where the difference in comparison step performed for the $n^{th}$ time by the turning tool is smaller than the difference in the comparison step performed for the $n-1^{th}$ time. As a special case, the external server may store the machining condition and the cumulative machining amount up to the $n-1^{th}$ time, in a case where the difference when the cutting insert is replaced does not exceed the threshold data.

According to the above-described configuration, even though the abrasion loss of the cutting insert is small, the special case is the machining condition in a case where the cutting insert is replaced. Damage to the cutting insert is considered as a case where the cutting insert needs to be replaced in the special case. According to the above-described configuration, the external server stores a plurality of the special cases. In this manner, it is possible to collect data for predicting the machining condition which may cause damage to the cutting insert.

In the above-described turning method, the external server may be connected to a plurality of the turning tools via a network.

According to the above-described configuration, the external server is connected to the plurality of turning tools. In this manner, various types of data can be collected from the plurality of turning tools.

Advantageous Effects of Invention

According to the present invention, it is possible to provide a turning tool which can reduce the machining cost by shortening the time required for measurement. In addition, in a case where additional machining is performed in accordance with a measurement result, it is possible to prevent a product machined out of a tolerance from flowing out to a subsequent step. Consequently, it is possible to achieve reduced manufacturing cost.

DESCRIPTION OF EMBODIMENTS

Hereinafter, a turning tool 1 according to an embodiment of the present invention will be described with reference to the drawings. In the following drawings, in order to facilitate understanding of each configuration, a scale and the number of respective structures may be different from those of an actual structure.

<Turning Tool>

Figure 1:
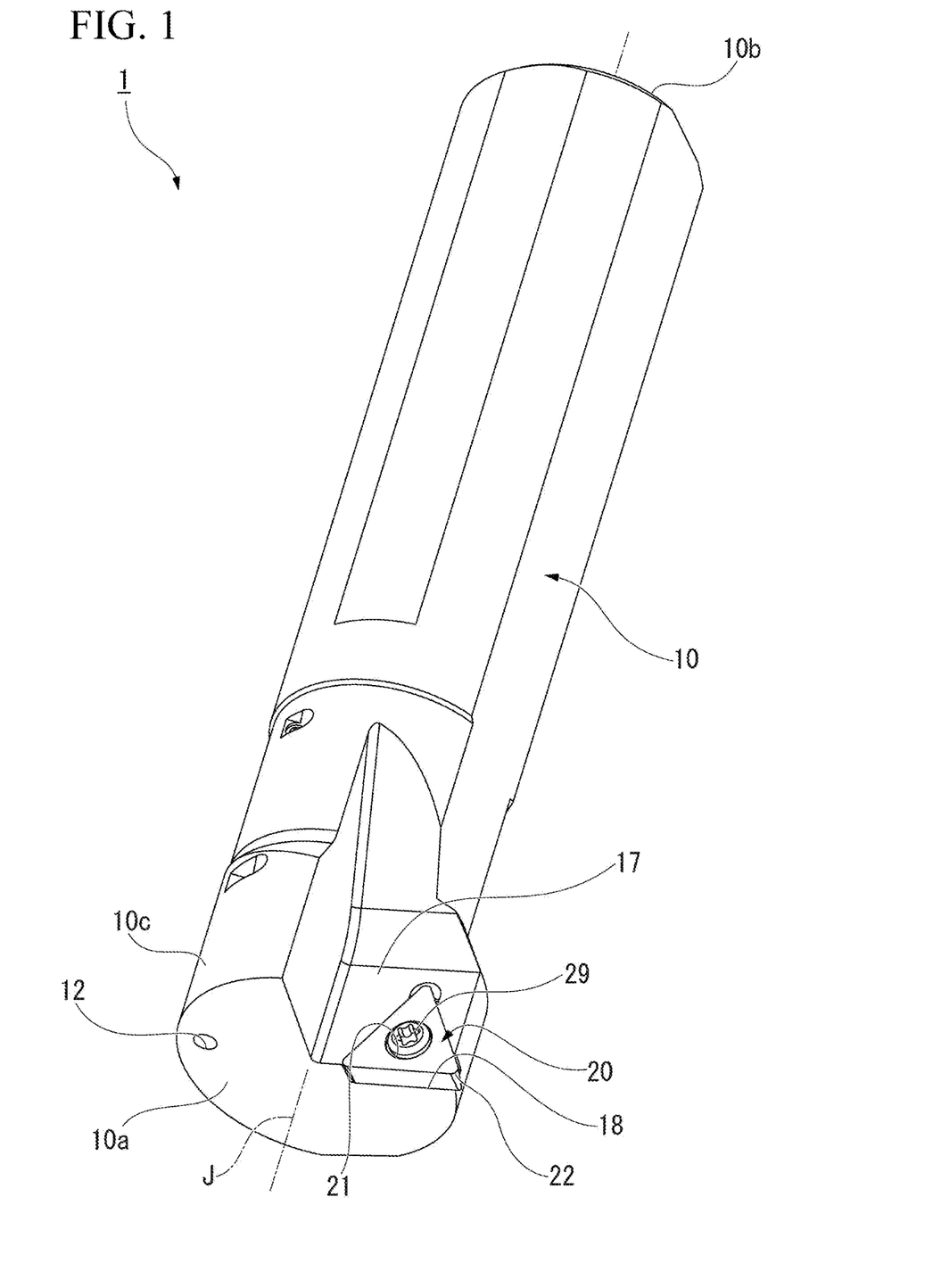
FIG. 1 is a perspective view of a turning tool according to an embodiment.
Figure 2:
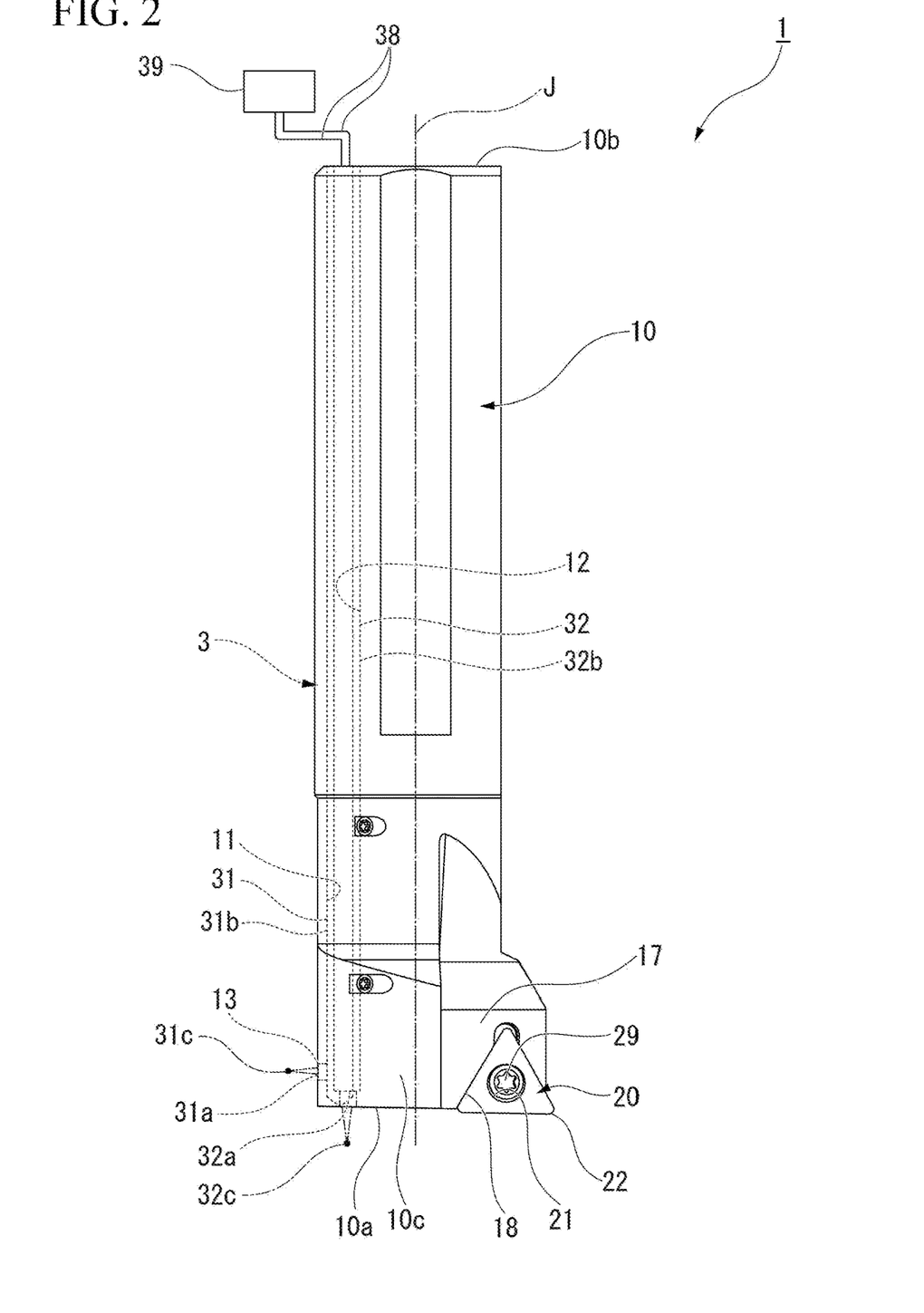
FIG. 2 is a plan view of the turning tool according to the embodiment.
Figure 3:
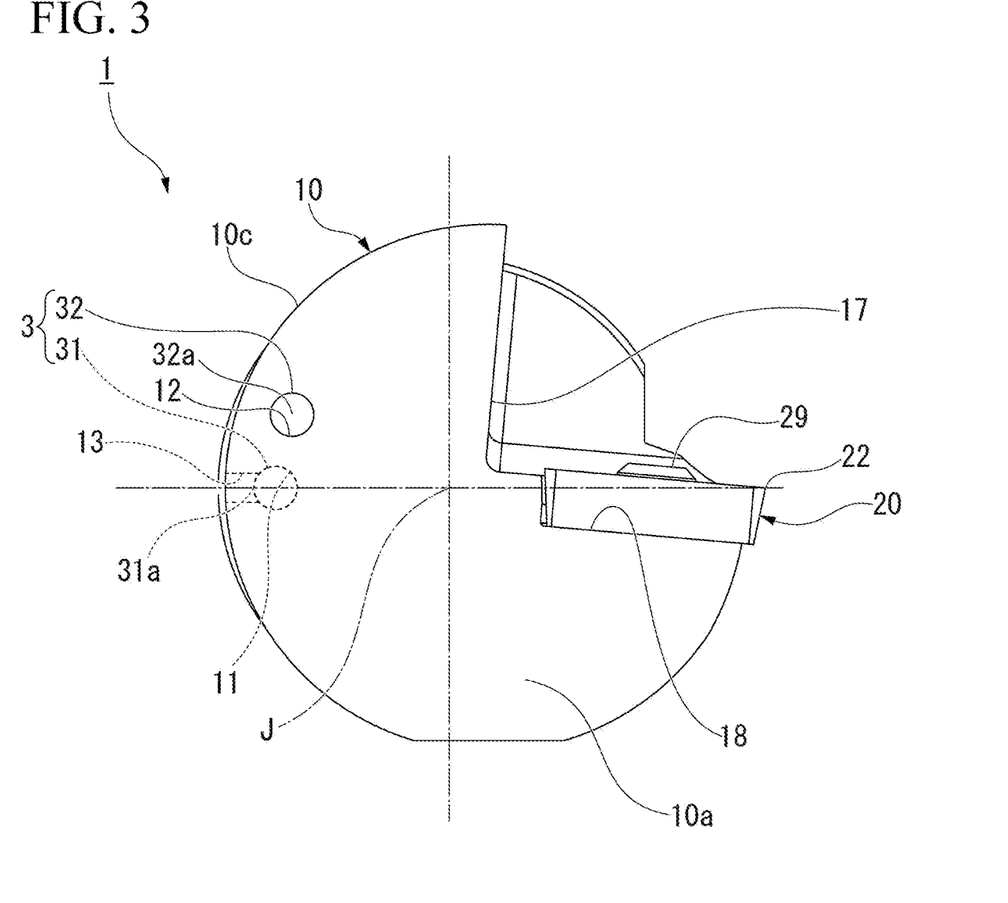
FIG. 3 is a front view of the turning tool according to the embodiment.

FIG. 1 is a perspective view of the turning tool 1 according to the present embodiment. FIG. 2 is a plan view of the turning tool 1. FIG. 3 is a front view of the turning tool 1.

The turning tool 1 according to the present embodiment is a boring bar that performs turning machining such as boring on a workpiece such as a metal material rotated around a spindle. A posterior end part of the turning tool 1 is detachably held by a jig (cutter holder) (not illustrated). In addition, the jig which holds the turning tool 1 is fixed to a machine tool (lathe) such as a lathe (not illustrated).

As illustrated in FIGS. 2 and 3, the turning tool 1 includes a tool body 10, a cutting insert 20 attached to the tool body 10, and a measurement device 3 attached to the tool body 10. The measurement device 3 measures a distance to an object (for example, a machined surface formed by the cutting insert) that exists at a position directly facing the measurement device 3 around the tool body 10.

The tool body 10 is a rod body extending in an axial shape. Here, a tool axis J is set along an extending direction of the tool body 10. That is, the tool body 10 extends along the tool axis J.

In the following description, unless otherwise specified, a direction parallel to the tool axis J will be simply referred to as an "axial direction", a radial direction around the tool axis J will be simply referred to as a "radial direction", and a circumferential direction around the tool axis J, that is, an axial circumference of the tool axis J will be simply referred to as a "circumferential direction".

As illustrated in FIG. 3, the tool body 10 has a substantially circular shape when viewed in the axial direction. That is, the tool body 10 has a columnar shape. A tip 10a of the tool body 10 has a cutout portion 17 cut out by approximately 90° along the circumferential direction. A base 18 to which the cutting insert 20 is fixed is disposed on one surface facing in the circumferential direction of the cutout portion 17. That is, the tool body 10 has the base 18 disposed on the tip 10a.

The cutting insert 20 is detachably attached to the base 18 by using a fixing screw 29. The cutting insert 20 has an attachment hole 21 into which the fixing screw 29 is inserted. The cutting insert 20 has a triangular prism shape whose thickness direction is a penetrating direction of the attachment hole 21. The cutting insert 20 has a pair of main surfaces facing in the thickness direction and having a triangular shape in a plan view, and a side surface connecting the pair of main surfaces to each other. A cutting edge 22 is disposed on a ridgeline between the main surface and the side surface of the cutting insert 20.

A shape of the cutting insert 20 is not limited to that according to the present embodiment.

As illustrated in FIG. 2, a portion of the cutting edge 22 protrudes to an axial tip side with respect to the tip 10a of the tool body 10. In addition, a portion of the cutting edge 22 protrudes radially outward with respect to an outer peripheral surface 10c facing radially outward of the tool body 10. Therefore, a portion of the cutting edge 22 is located in an axial forefront and a radial outermost end of the turning tool 1.

The tool body 10 has a first accommodation hole 11, a second accommodation hole 12, and an opening hole 13.

The first accommodation hole 11 extends along the axial direction. The first accommodation hole 11 is open on a posterior end 10b of the tool body 10, and extends to the tip 10a of the tool body 10. In the present embodiment, the first accommodation hole 11 is not open to the tip 10a of the tool body 10. However, the first accommodation hole 11 may be open to the tip 10a of the tool body 10.

The second accommodation hole 12 extends along the axial direction. The second accommodation hole 12 is open on the posterior end 10b and the tip 10a of the tool body 10. That is, the second accommodation hole 12 penetrates the tool body 10 along the axial direction.

The opening hole 13 extends radially outward from the first accommodation hole 11. The opening hole 13 is open on the outer peripheral surface 10c of the tool body 10. The first accommodation hole 11 is located across the tool axis J on a side opposite to the cutting edge 22 of the cutting insert 20.

As illustrated in FIG. 2, the measurement device 3 has a first distance sensor 31, a second distance sensor 32, and a controller 39.

The first distance sensor 31 and the second distance sensor 32 respectively measure a distance to an object (machined surface formed by the cutting insert) existing at a position directly facing the first distance sensor 31 and the second distance sensor 32 around the tool body 10. In the present embodiment, the first distance sensor 31 and the second distance sensor 32 are optical distance sensors using a white coaxial and confocal method.

The first distance sensor 31 and the second distance sensor 32 are not particularly limited as long as both of these can measure the distance to the object. However, the first distance sensor 31 and the second distance sensor 32 are preferably non-contact distance sensors, and more preferably optical distance sensors from a viewpoint of measurement accuracy.

The first distance sensor 31 and the second distance sensor 32 respectively have cylindrical housings 31b and 32b extending along the axial direction and detectors 31a and 32a. A cable 38 is connected to a posterior end side of the housings 31b and 32b.

In the first distance sensor 31 and the second distance sensor 32, white light is emitted from the detectors 31a and 32a. A special lens group is disposed in the detectors 31a and 32a. White light is focused at different positions for each color (wavelength) by the special lens group. The focused light of the color (wavelength) returns to the detectors 31a and 32a in accordance with the distance between the detectors 31a and 32a and the object. The detectors 31a and 32a receive only the focused light. The first distance sensor 31 and the second distance sensor 32 measure the distance between the detectors 31a and 32a and the object, based on color information of light received by the detectors 31a and 32a.

The first distance sensor 31 and the second distance sensor 32 can measure the distance to the object located inside a range (detection range) where light of each color (each wavelength) can be focused. The detection range is located on an optical axis of light emitted from the detector 31a. Therefore, measurement points 31c and 32c of the first distance sensor 31 and the second distance sensor 32 are located on the optical axis of white light. The turning tool 1 can measure the distance between the detectors 31a and 32a and a measurement target by locating the measurement target inside the detection range.

In the first distance sensor 31, the detector 31a is disposed on an outer peripheral surface near the tip of a housing 31b. The detector 31a faces radially outward of the tool axis J. The detector 31a emits white light radially outward. The optical axis of white light emitted from the detector 31a extends along the radial direction. The measurement point 31c of the first distance sensor 31 is located radially outward of the detector 31a. The first distance sensor 31 measures the distance to the object (machined surface) located radially outward.

The first distance sensor 31 is accommodated in the first accommodation hole 11. The detector 31a of the first distance sensor 31 is exposed radially outward from the opening hole 13. The detector 31a emits white light toward the measurement target via the opening hole 13.

In the second distance sensor 32, the detector 32a is disposed in the tip of the housing 32b. The detector 32a faces the tip side. The detector 32a emits white light toward an axial tip side. The optical axis of white light emitted from the detector 32a extends along the axial direction. The measurement point 32c of the second distance sensor 32 is located in the axial tip side of the detector 32a. The second distance sensor 32 measures the distance to the object (machined surface) located on the axial tip side.

The second distance sensor 32 is accommodated in the second accommodation hole 12. The detector 32a of the second distance sensor 32 is exposed to the axial tip side from an opening in the tip of the tool body 10 of the second accommodation hole 12. The detector 32a emits white light toward the measurement target from the opening in the tip of the tool body 10 of the second accommodation hole 12.

The controller 39 is connected to the first distance sensor 31 and the second distance sensor 32 via the cable 38. The controller 39 controls the first distance sensor 31 and the second distance sensor 32. In addition, the controller 39 according to the present embodiment includes a white light source (not illustrated). The controller 39 supplies white light to the detectors 31a and 32a of the first distance sensor 31 and the second distance sensor 32 via the cable 38 formed of an optical fiber.

The controller 39 may be connected to the machine tool. In this case, based on position information of the tool body 10 which is obtained from the machine tool and measurement results obtained by the first distance sensor 31 and the second distance sensor 32, it is possible to output position accuracy of the machined surface.

According to the present embodiment, the turning tool 1 has the first distance sensor 31 which measures the radially outer distance of the tool axis J. The turning tool 1 can measure the distance to the radially facing machined surface machined by the cutting insert 20. Therefore, when the machined surface is measured after the turning tool 1 forms the radially facing machined surface, it is not necessary to perform a step of temporarily drawing apart the turning tool from the workpiece. As a result, it is possible to shorten the time required for the measurement step during turning machining, and it is possible to reduce the machining cost required for the turning machining.

The first distance sensor 31 can measure an outer diameter, an inner diameter, roundness, and surface roughness of the radially facing machined surface machined by the cutting insert 20.

As illustrated in FIG. 2, an axial position of the tool axis J of the measurement point 31c measured by the first distance sensor 31 overlaps an axial position of the cutting insert 20. According to the present embodiment, the first distance sensor 31 can measure a periphery of a cutting position of the workpiece machined by the cutting edge 22 of the cutting insert 20. Therefore, in the measurement step of using the first distance sensor 31, it is possible to reduce a movement distance for moving the turning tool 1 in the axial direction of the tool axis J. As a result, it is possible to shorten the time required for a measurement step during turning machining.

According to the present embodiment, the turning tool 1 has the second distance sensor 32 which measures the axial tip side distance of the tool axis J. The turning tool 1 can measure the distance to the axially facing machined surface machined by the cutting insert 20. When the machined surface is measured after the turning tool 1 forms the axially facing machined surface, it is not necessary to perform a step of temporarily drawing apart the turning tool from the workpiece. As a result, it is possible to shorten the time required for the measurement step during turning machining, and it is possible to reduce the machining cost required for the turning machining.

The second distance sensor 32 can measure an axial position of a stepped portion and a hole bottom portion, and surface roughness of the axially facing machined surface, which are machined by the cutting insert 20.

According to the present embodiment, the first distance sensor 31 and the second distance sensor 32 are incorporated into the tool body 10. Therefore, the first distance sensor 31 and the second distance sensor 32 can be protected from vibrations and chips during the turning machining.

In addition, as illustrated in FIG. 2, the detector 31a of the first distance sensor 31 is disposed to be recessed radially inward from the outer peripheral surface 10c of the tool body 10. Similarly, the detector 32a of the second distance sensor 32 is disposed to be recessed to the axially posterior end side from the tip surface of the tool body 10. Therefore, the detectors 31a and 32a can be protected from chips.

<Turning Method>

Next, a turning method using the turning tool 1 according to the present embodiment will be described.

FIGS. 4A to 4D are views illustrating a procedure of an example of the turning method according to the present embodiment.

As illustrated in FIGS. 4A to 4D, a workpiece W in the turning method according to the present embodiment has a stepped through-hole 40. The through-hole 40 has a stepped surface 43, a large-diameter portion 41 on one side in the axial direction with respect to the stepped surface 43, and a small-diameter portion 42 on the other side in the axial direction with respect to the stepped surface 43. The turning method according to the present embodiment is a machining method for finishing the large-diameter portion 41 of the through-hole 40 and an inner peripheral surface of the stepped surface 43.

Figure 4A:
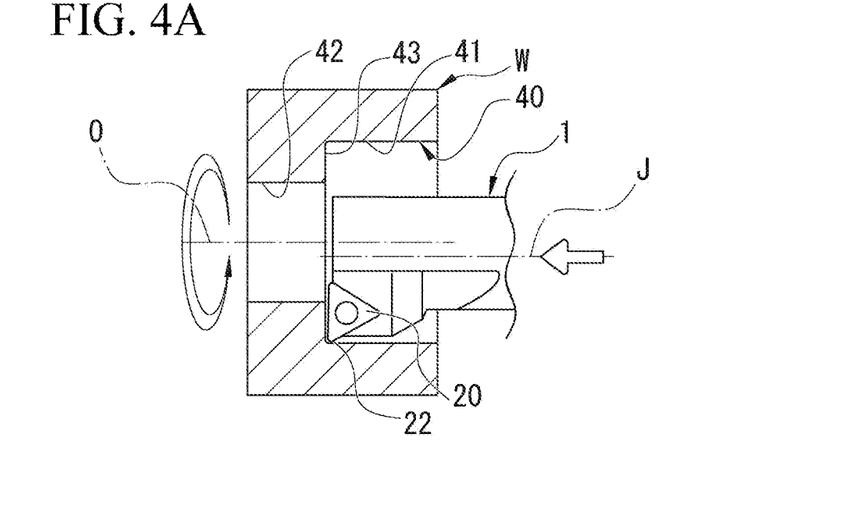
FIG. 4A is a view illustrating a procedure of an example of a turning method according to the embodiment.

First, as illustrated in FIG. 4A, a first turning step of machining the inner peripheral surface of the large-diameter portion 41 is performed.

The first turning step is performed while the workpiece W is rotated around a spindle O. In the first turning step, first, in a state where the tool axis J of the turning tool 1 is parallel to the spindle O, a radial outer end of the cutting edge 22 is aligned with a radial target dimension (target position) of the inner peripheral surface of the large-diameter portion 41. Furthermore, the turning tool 1 is moved along the axial tip to bring the cutting edge 22 of the cutting insert 20 into contact with the inner peripheral surface of the large-diameter portion 41. Next, in a state where the cutting edge 22 is in contact with the inner peripheral surface of the large-diameter portion 41, the turning tool 1 is moved to the axial tip. In this manner, the inner peripheral surface of the large-diameter portion 41 can be subjected to turning machining by the cutting edge 22.

Figure 4B:
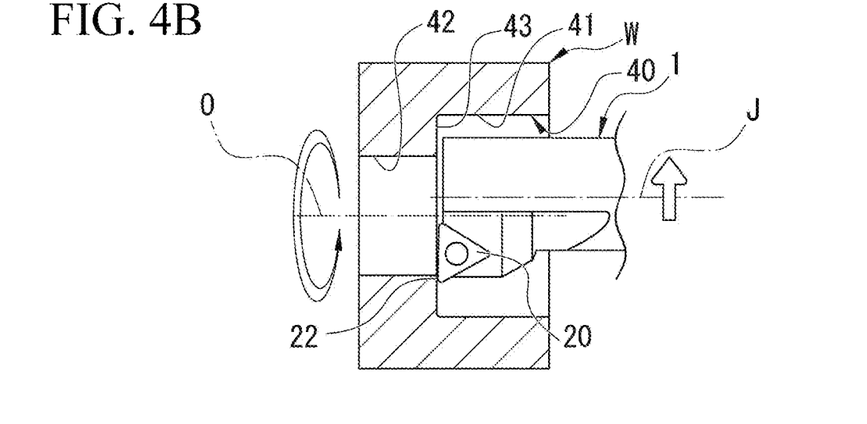
FIG. 4B is a view illustrating a procedure of an example of the turning method according to the embodiment.

Next, as illustrated in FIG. 4B, a second turning step of machining the stepped surface 43 is performed.

Subsequently to the first turning step, the second turning step is performed while the workpiece W is rotated around the spindle O. In the second turning step, first, an axial forefront of the cutting edge 22 is aligned with an axial target dimension (target position) of the stepped surface 43. Next, in a state where the cutting edge 22 of the cutting insert 20 is in contact with a corner portion between the large-diameter portion 41 and the stepped surface 43, the cutting edge 22 of the cutting insert 20 is moved radially inward while a state of being in contact with the stepped surface 43 is maintained. In this manner, the stepped surface 43 can be subjected to turning machining by the cutting edge 22.

As described above, the first turning step and the second turning step are steps of forming the machined surface by bringing the cutting insert into contact with the workpiece W and machining the workpiece to the target position while rotating the workpiece W around the spindle O.

In the present embodiment, a case has been described where the second turning step is performed after the first turning step. However, the order may be reversed. In addition, in the first turning step and the second turning step, the moving direction of the cutting edge 22 may be reversed.

Figure 4C:
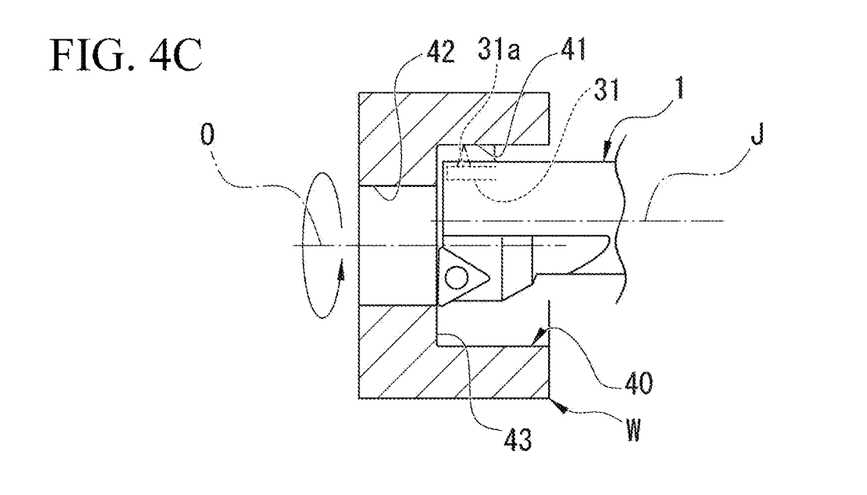
FIG. 4C is a view illustrating a procedure of an example of the turning method according to the embodiment.

Next, as illustrated in FIG. 4C, a first measurement step of measuring the inner peripheral surface (machined surface, object) of the large-diameter portion 41 is performed.

In the first measurement step, first, the turning tool 1 is moved in the radial direction so that the detector 31a of the first distance sensor 31 faces the inner peripheral surface of the large-diameter portion 41. At this time, the inner peripheral surface of the large-diameter portion 41 is located inside the detection range of the detector 31a. In this state, while the workpiece W is rotated around the spindle O at low speed, the first distance sensor 31 measures the dimension or surface roughness of the inner peripheral surface of the large-diameter portion 41 at a plurality of points along the circumferential direction. A rotation speed of the workpiece in the first measurement step is appropriately set in accordance with a response speed of the first distance sensor 31. As an example, the rotation speed of the workpiece in the first measurement step is 10°/min.

The turning tool 1 may be moved to the posterior end side of the tool axis J when the inner peripheral surface of the large-diameter portion 41 is measured by the first distance sensor 31. In this case, it is possible to measure positions of the plurality of points aligned in the axial direction on the inner peripheral surface.

Figure 5:
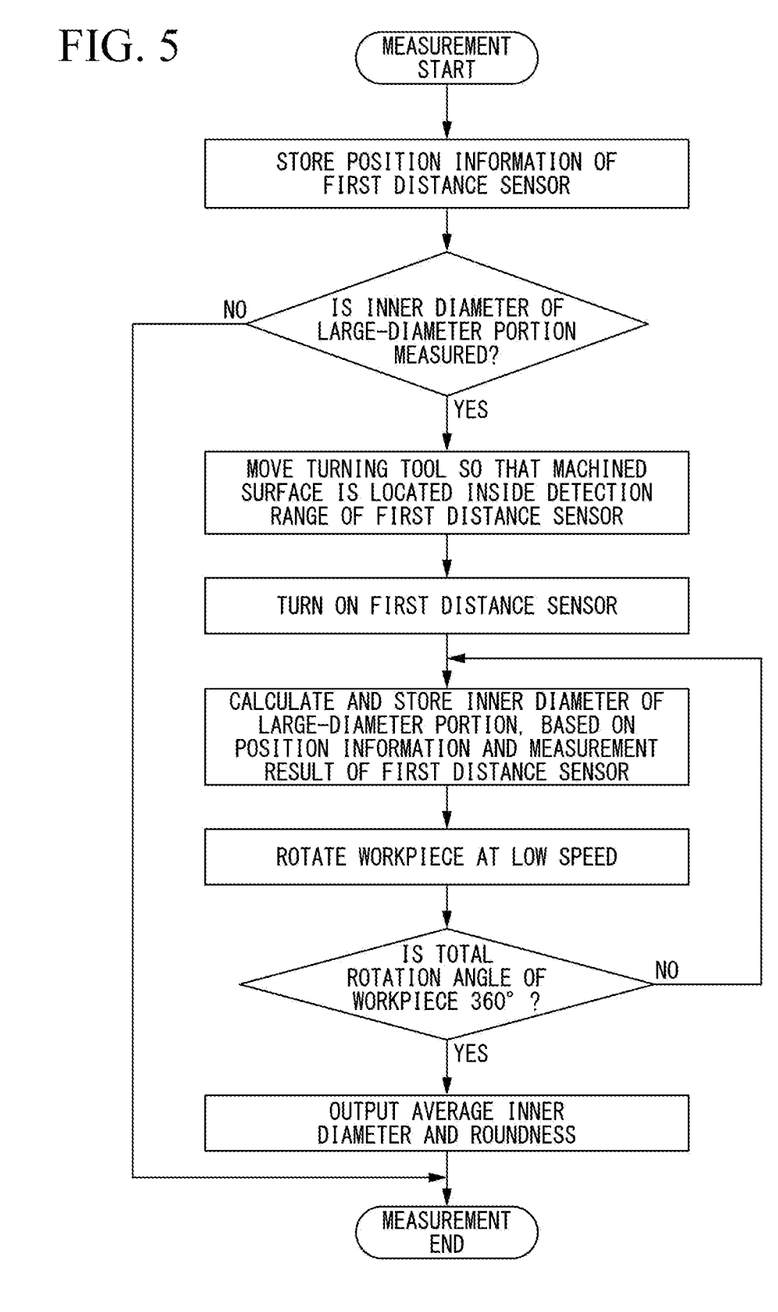
FIG. 5 is a flowchart of a first measurement step.

FIG. 5 is a flowchart of the first measurement step. In a procedure illustrated in the flowchart, the inner diameter and the roundness of the large-diameter portion 41 are measured.

In the first measurement step, before the measurement starts, the controller 39 obtains position information of the first distance sensor 31 in advance from the machine tool.

Next, the controller 39 determines whether or not to measure the inner diameter of the large-diameter portion 41, and when the measurement is not necessary, the controller 39 completes the first measurement step.

Next, the controller 39 issues a command to the machine tool to move the turning tool 1. In this manner, the turning tool 1 is moved so that the machined surface is located inside the detection range of the first distance sensor 31.

Next, the controller 39 activates the first distance sensor 31, and causes the first distance sensor 31 to start the measurement.

Next, the controller 39 starts an operation of calculating and storing the inner diameter of the large-diameter portion 41, based on the position information and the measurement result of the first distance sensor 31.

Next, the controller 39 issues a command to the machine tool to rotate the workpiece W around the spindle O at the low speed.

Furthermore, after the controller 39 determines that the total rotation angle of the workpiece W reaches 360°, the controller 39 calculates and outputs the average inner diameter and roundness of the large-diameter portion 41.

Figure 4D:
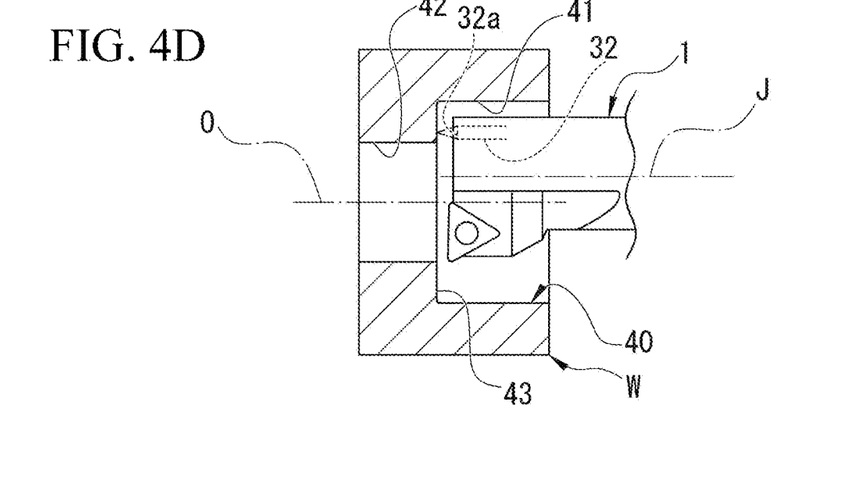
FIG. 4D is a view illustrating a procedure of an example of the turning method according to the embodiment.

Next, as illustrated in FIG. 4D, a second measurement step of measuring the stepped surface (machined surface, object) 43 is performed.

In the second measurement step, first, the turning tool 1 is moved in the axial direction so that the detector 32a of the second distance sensor 32 faces the stepped surface 43. At this time, the stepped surface 43 is located inside the detection range of the measurement point 32c of the detector 32a. The second distance sensor 32 measures the position or the surface roughness of the stepped surface 43.

The workpiece W may be rotated around the spindle O at low speed when the stepped surface 43 is measured by the second distance sensor 32. In this case, it is possible to measure positions of a plurality of points inside the stepped surface 43.

Figure 6:
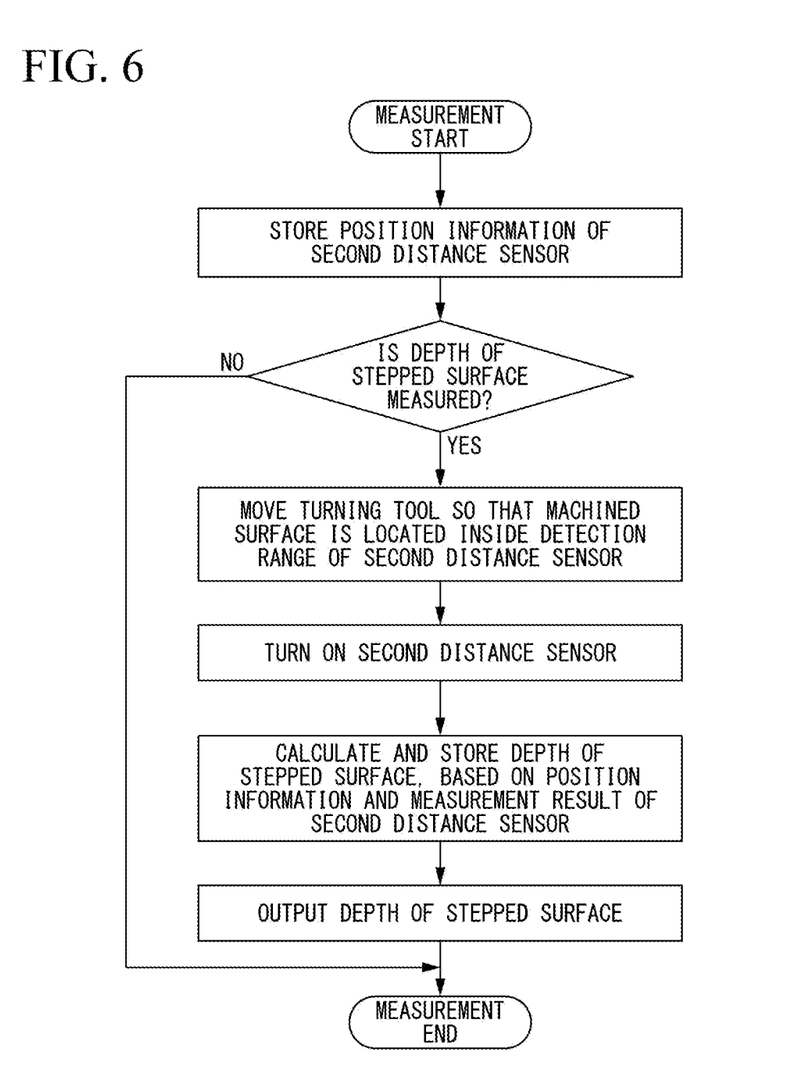
FIG. 6 is a flowchart of a second measurement step.

FIG. 6 is a flowchart of the second measurement step. In a procedure illustrated in the flowchart, a depth of the stepped surface 43 is measured.

In the second measurement step, the controller 39 obtains the position information of the second distance sensor 32 in advance from the machine tool before the measurement starts.

Next, the controller 39 determines whether or not to measure the depth of the stepped surface 43, and when the measurement is not necessary, the controller 39 completes the second measurement step.

Next, the controller 39 issues a command to the machine tool to move the turning tool 1. In this manner, the turning tool 1 is moved so that the machined surface is located inside the detection range of the second distance sensor 32.

Next, the controller 39 activates the second distance sensor 32, and causes the second distance sensor 32 to start the measurement.

Next, the controller 39 calculates and stores the depth of the stepped surface 43, based on the position information and the measurement result of the second distance sensor 32.

Furthermore, the controller 39 outputs the stored depth of the stepped surface 43.

As described above, the first and second measurement steps are steps of causing the measurement device 3 to measure the position of the machined surface after the machined surface is located inside the detection range of the measurement device 3.

Figure 7:
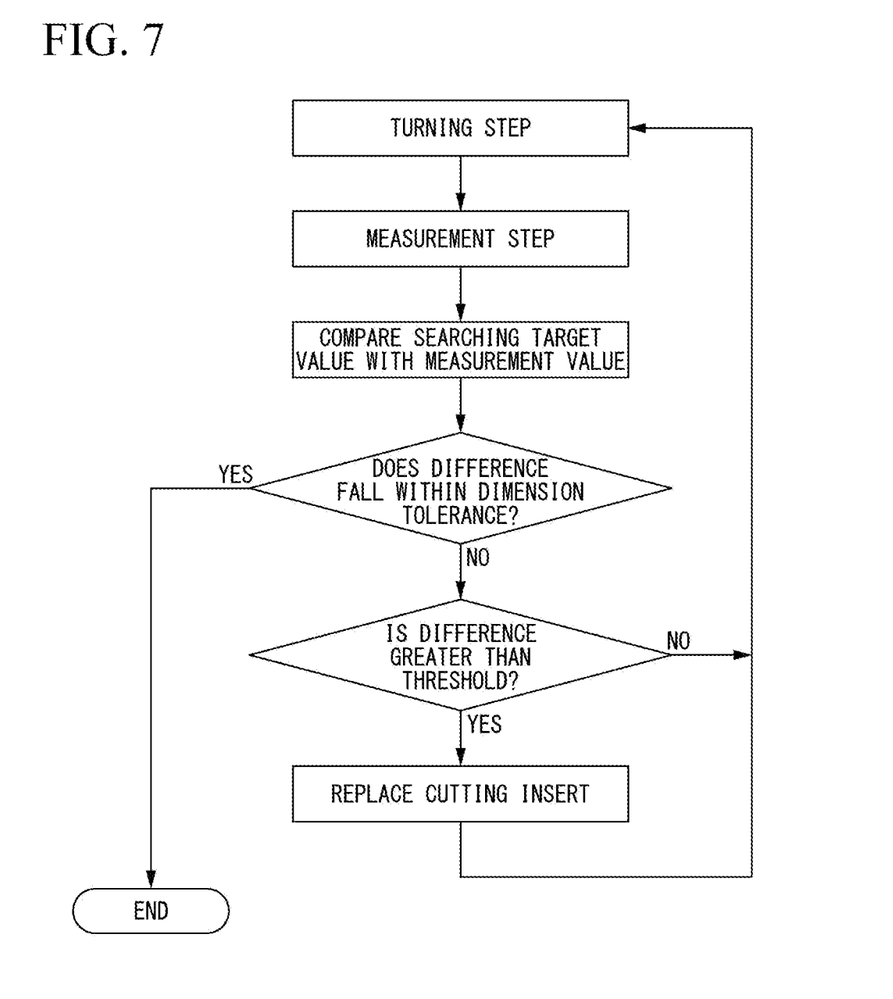
FIG. 7 is a flowchart illustrating entire contents of the turning method including the turning step and the measurement step which are described above.

FIG. 7 is a flowchart illustrating entire contents of the turning method including the turning step and the measurement step which are described above.

A comparison step is performed after the turning step (first and second turning steps) and the measurement step (first and second measurement steps).

In the comparison step, the controller 39 calculates a difference by comparing a target position of the machined surface in the turning step with a measurement position of the machined surface measured in the measurement step.

Furthermore, based on the comparison in the comparison step, the controller 39 determines that additional machining is required in a case where the difference between the target position and the measurement position is greater than a tolerance, and the controller 39 performs an additional machining step. That is, the turning method according to the present embodiment has the additional machining step in which the workpiece W is additionally machined by the turning tool 1 in accordance with the difference between the target position and the measurement position in the comparison step.

In addition, based on the comparison in the comparison step, the controller 39 determines that the cutting insert 20 needs to be replaced in a case where the difference between the target position and the measurement position is greater than a preset threshold. In this case, for example, the controller 39 displays a warning indicating that the cutting insert 20 needs to be replaced. The reason is considered to be because abrasion of the cutting insert 20 is remarkable in a case where the difference between the target position and the measurement position is great. An operator confirms the warning displayed by the controller 39, and replaces the cutting insert 20. That is, the turning method according to the present embodiment has a cutting insert replacement step of replacing the cutting insert 20 in a case where the difference between the target position and the measurement position in the comparison step exceeds a threshold.

A configuration for realizing IoT (Internet of Things) by connecting the turning tool 1 to the Internet and utilizing measurement data will be described.

Figure 8:
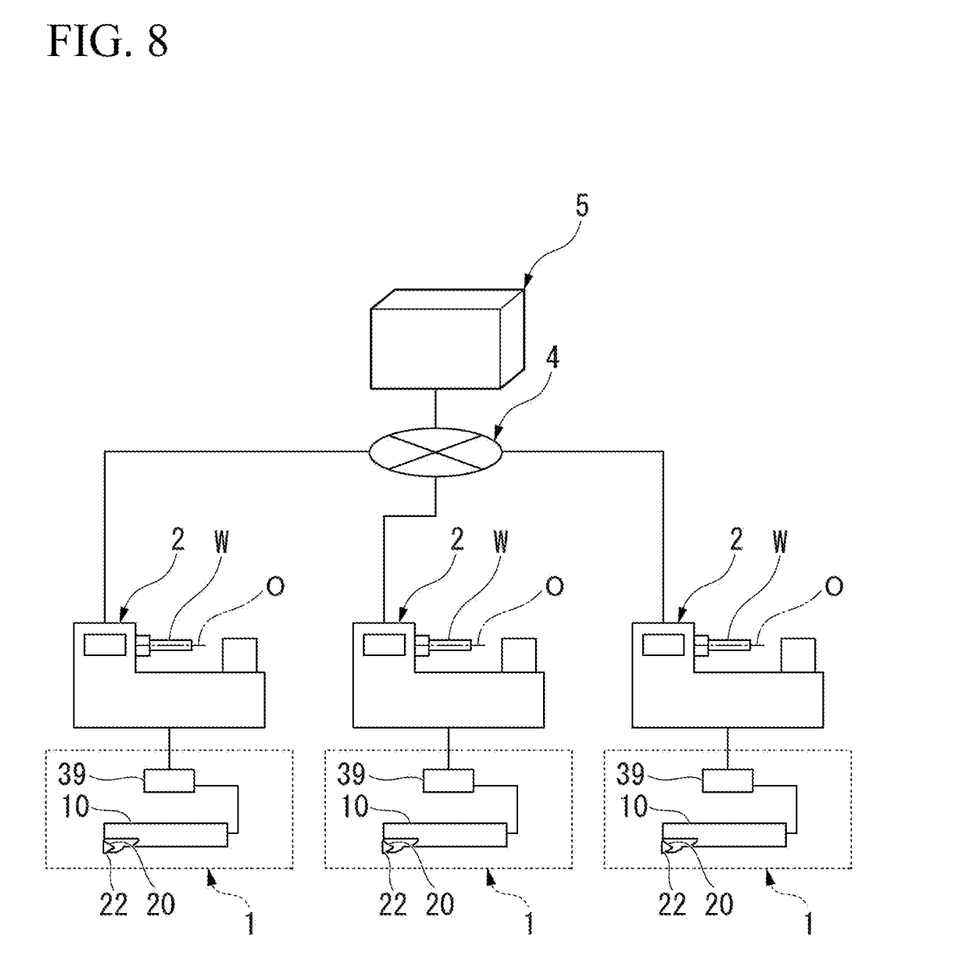
FIG. 8 is a schematic view illustrating a configuration example of a turning tool that realizes IoT.

FIG. 8 is a schematic view illustrating a configuration example of the turning tool 1 that realizes the IoT.

As illustrated in FIG. 8, the controller 39 of the turning tool 1 is connected to a machine tool 2 that holds the workpiece W. The controller 39 of the turning tool 1 can acquire a value of the target position via the machine tool. In addition, the machine tool 2 is connected to an external server 5 via a network 4. That is, the turning tool 1 is connected to the external server via the machine tool 2. One external server 5 is connected to a plurality of the machine tools 2 via the network 4.

The external server 5 transmits and receives data to and from the turning tool 1 via the network 4. The plurality of turning tools 1 are connected to the external server 5. Accordingly, the external server 5 stores the data when the turning machining is performed by the plurality of turning tools 1.

The target position of the machined surface in the first and second turning steps, the measurement position of the machined surface measured in the first and second measurement steps, the cumulative machining amount of the workpiece W machined using the cutting insert 20, and the machining conditions in the first and second turning steps are transmitted to the external server 5 from the turning tool 1 via the network 4, and are stored in the external server 5.

According to the present embodiment, the external server 5 stores the target position, the measurement position, the cumulative machining amount, and the machining conditions. In this manner, the data can be utilized for more preferable machining conditions and life setting of the cutting insert 20.

The cumulative machining amount stored in the external server 5 is a cumulative value of the machining amount of the workpiece W machined by one cutting edge 22 of one cutting insert 20.

The machining conditions stored in the external server 5 include at least one of the type of the cutting insert 20, the type of the workpiece W, the diameter of the machined surface of the workpiece W, the rotation speed of the spindle O, the cutting depth of the turning tool 1, and the feed-speed of the turning tool 1. In addition, the machining conditions may include a temperature when the turning step is performed, a temperature of the workpiece, and a temperature of the cutting insert.

In addition, the external server 5 pre-stores threshold data of an abrasion loss of the cutting insert 20 which needs to be replaced. The threshold data stored in the external server 5 is transmitted to the controller 39 of the turning tool 1, and can be used as a threshold when the difference between the target position and the measurement position is compared with the threshold data in the cutting insert replacement step. The threshold data may be transmitted to the machine tool 2 instead of the turning tool 1, and may be compared with the difference in the machine tool 2. That is, the external server 5 transmits the threshold data to the turning tool 1 or the machine tool 2 to which the turning tool 1 is attached, via the network 4.

As a critical cumulative machining amount, the external server 5 stores the cumulative machining amount in a case where the difference between the target position and the measurement position exceeds the threshold data. The stored critical cumulative machining amount is used after the subsequent first and second turning steps are performed. Specifically, the external server 5 compares the cumulative machining amount at the end of the subsequent turning step with the critical cumulative machining amount stored in the external server 5. When the cumulative machining amount at the end of the turning step approaches the critical cumulative machining amount, the external server 5 transmits a notification signal via the network 4 to the controller 39 of the turning tool 1 or the machine tool 2 to notify that the cutting insert 20 shortly needs replacing. In addition, the controller 39 or the machine tool 2 receiving the notification signal displays to an operator that the cutting insert 20 shortly needs replacing. In this manner, based on the notification, the operator can prepare for replacing of the cutting insert 20, such as confirming a stock of the cutting insert 20.

The controller 39 of the turning tool 1 or the machine tool 2 performs the comparison step, when receiving the notification signal transmitted from the external server 5. The controller 39 or the machine tool 2 displays a warning indicating that the cutting insert 20 needs to be replaced, when the difference between the target position and the measurement position in the comparison step is greater than the threshold data. The operator confirms the warning displayed by the controller 39, and replaces the cutting insert 20. In this manner, the reliability of the turning step can be improved by reducing the possibility that the turning step may be performed in a state where abrasion of the cutting insert 20 excessively progresses.

In addition, the external server 5 collects the machining conditions of cases where the cutting insert 20 is damaged. The external server 5 determines that the cutting insert 20 is replaced in a case where the difference in the $n^{th}$ comparison step performed by the turning tool 1 is smaller than the difference in the $n-1^{th}$ comparison step. The difference in the comparison step theoretically gradually increases depending on the abrasion loss of the cutting insert 20 as the cumulative machining amount of the workpiece W increases. Therefore, in a case where the difference is smaller, it can be determined that the cutting insert 20 is replaced.

In a case where the difference when the cutting insert 20 is replaced does not exceed the threshold data, it means that the cutting insert 20 is replaced even though the abrasion loss of the cutting insert 20 is small. Therefore, it is estimated that the cutting insert 20 is damaged.

In a case where the difference when the cutting insert 20 is replaced does not exceed the threshold data, the external server 5 stores the machining conditions and the cumulative machining amount up to the $n-1^{th}$ time, as a special case. The external server 5 stores a plurality of the special cases. Accordingly, the external server 5 can collect data for predicting a machining condition that may cause damage to the cutting insert 20.

Hitherto, the embodiments according to the present invention have been described. However, the respective configurations and combinations thereof in the embodiments are merely examples. Additions, omissions, substitutions, and other modifications of the configurations can be made within the scope not departing from the concept of the present invention. In addition, the present invention is not limited by the embodiments.

For example, in the above-described embodiment, a boring bar has been described as an example of a turning tool. However, the turning tool may adopt any configuration as long as the turning tool is used for machining using a lathe. For example, the turning tool may be an outer-diameter machining tool.

INDUSTRIAL APPLICABILITY

In turning machining, it is possible to improve dimensional accuracy of a machined surface.

REFERENCE SIGNS LIST 1 turning tool
2 machine tool
4 network
3 measurement device
5 external server
10 tool body
10a tip
10c outer peripheral surface
11 first accommodation hole
12 second accommodation hole
13 opening hole
18 base
20 cutting insert
31 first distance sensor
32 second distance sensor
31a, 32a detector
31c, 32c measurement point
43 stepped surface (machined surface)
J tool axis
O spindle
W workpiece

What is claimed is:
1. A turning tool, comprising:
a tool body extending along a tool axis and having a base on a tip of the tool body;
a cutting insert detachably attached to the base and having a cutting edge; and
a measurement device attached to the tool body and configured to measure a distance from the tool body to an object,
wherein the measurement device has a first distance sensor which measures a distance to an object located radially outward of the tool axis,
wherein the tool body has
a first accommodation hole extending along an axial direction of the tool axis and is located across the tool axis on a side opposite to the cutting edge of the cutting insert, and
an opening hole extending radially outward of the tool axis from the first accommodation hole and opening on an outer peripheral surface of the tool body,
wherein the opening hole opens across the tool axis toward the side opposite to the cutting edge of the cutting insert,
wherein the first distance sensor is accommodated in the first accommodation hole,
wherein a detector of the first distance sensor is exposed radially outward from the opening hole, and
wherein an axial position of the tool axis of a measurement point measured by the first distance sensor overlaps an axial position of the cutting insert, and the measurement point is located across the tool axis on the side opposite to the cutting edge of the cutting insert.

2. The turning tool according to claim 1,
wherein the measurement device has a second distance sensor which measures a distance to an object located on an axial tip side of the tool axis.

3. The turning tool according to claim 2,
wherein the tool body has
a second accommodation hole extending along an axial direction of the tool axis and opening on the tip of the tool body,
wherein the second distance sensor is accommodated in the second accommodation hole, and
wherein a detector of the second distance sensor is exposed to the axial tip side from an opening of the second accommodation hole.

4. A turning method using the turning tool according to claim 1, the method comprising:
a turning step of forming a machined surface by bringing the cutting insert into contact with a workpiece while rotating the workpiece around a spindle so that the workpiece is machined to a target position; and
a measurement step of causing the measurement device to measure a position of the machined surface by locating the machined surface inside a detection range of the measurement device.

5. The turning method according to claim 4, further comprising:
a comparison step of calculating a difference by comparing the target position of the machined surface in the turning step with a measurement position of the machined surface measured in the measurement step.

6. The turning method according to claim 5, further comprising:
an additional machining step of additionally machining the workpiece by using the turning tool in accordance with the difference in the comparison step.

7. The turning method according to claim 5, further comprising:
a cutting insert replacement step of replacing the cutting insert, in a case where the difference exceeds a threshold in the comparison step.

8. The turning method according to claim 5,
wherein the target position of the machined surface in the turning step, the measurement position of the machined surface measured in the measurement step, and a cumulative machining amount of the workpiece machined using the cutting insert are stored in an external server via a network.

9. The turning method according to claim 8,
wherein the external server pre-stores threshold data of an abrasion loss of the cutting insert which needs to be replaced, and
wherein the external server transmits the threshold data via a network to the turning tool or a machine tool to which the turning tool is attached.

10. The turning method according to claim 9,
wherein the external server stores the cumulative machining amount in a case where the difference between the target position and the measurement position exceeds the threshold data, as a critical cumulative machining amount.

11. The turning method according to claim 10,
wherein when the cumulative machining amount approaches the critical cumulative machining amount, the external server transmits a notification signal via a network to the turning tool or the machine tool to notify that the cutting insert shortly needs replacing.

12. The turning method according to claim 11,
wherein when the notification signal is received, the comparison step is performed, and in a case where the difference between the target position and the measurement position is greater than the threshold data, the cutting insert is replaced.

13. The turning method according to claim 8,
wherein a machining condition in the turning step is stored in the external server via a network.

14. The turning method according to claim 13,
wherein the machining condition includes at least one of the type of cutting insert, the type of workpiece, the diameter of the workpiece, the rotation speed of the spindle, the cutting depth of the turning tool, and the feed-speed of the turning tool.

15. The turning method according to claim 13,
wherein the external server pre-stores threshold data of an abrasion loss of the cutting insert which needs to be replaced,
wherein the external server determines that the cutting insert is replaced in a case where the difference in the comparison step performed for the $n^{th}$ time by the turning tool is smaller than the difference in the comparison step performed for the $n-1^{th}$ time, and
wherein the external server stores the machining condition and the cumulative machining amount up to the $n-1^{th}$ time as a special case, in a case where the difference when the cutting insert is replaced does not exceed the threshold data.

16. The turning method according to claim 8,
wherein the external server is connected to a plurality of the turning tools via a network.

* * * * *